(12) United States Patent
Brown (10) Patent No.: US 10,476,823 B2
(45) Date of Patent: Nov. 12, 2019

(54) AUTOMATIC IDENTIFICATION AND RETRIEVAL OF MESSAGE ATTACHMENTS IN A MESSAGE CONVERSATION

(71) Applicant: BlackBerry Limited, Waterloo (CA)

(72) Inventor: David Andrew Brown, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 427 days.

(21) Appl. No.: 14/476,951

(22) Filed: Sep. 4, 2014

(65) Prior Publication Data
US 2016/0072743 A1    Mar. 10, 2016

(51) Int. Cl.
*H04L 12/58* (2006.01)
*H04L 29/08* (2006.01)

(52) U.S. Cl.
CPC ............ *H04L 51/08* (2013.01); *H04L 51/046* (2013.01); *H04L 51/16* (2013.01); *H04L 67/1095* (2013.01); *H04L 51/02* (2013.01)

(58) Field of Classification Search
CPC ........... G06F 3/04842; G06F 17/30011; H04L 51/22; H04L 51/08; H04L 51/32; H04L 51/14
USPC ........................................................ 709/206
See application file for complete search history.

(56) References Cited

U.S. PATENT DOCUMENTS

| | | | |
|---|---|---|---|
| 7,035,902 B1 * | 4/2006 | Bates ................... | G06Q 10/107 709/206 |
| 7,788,326 B2 | 8/2010 | Buchheit et al. | |
| 7,814,155 B2 | 10/2010 | Buchheit et al. | |
| 7,818,378 B2 | 10/2010 | Buchheit et al. | |
| 7,912,904 B2 | 3/2011 | Buchheit et al. | |
| 8,150,924 B2 | 4/2012 | Buchheit et al. | |
| 8,560,615 B2 | 10/2013 | Buchheit et al. | |
| 8,676,913 B1 * | 3/2014 | Roche ..................... | H04L 51/32 709/206 |
| 8,775,520 B1 | 7/2014 | Lewis et al. | |
| 2002/0013817 A1 * | 1/2002 | Collins ................ | G06Q 10/107 709/206 |
| 2004/0024826 A1 * | 2/2004 | Halahmi ............. | H04L 65/4069 709/206 |
| 2006/0265458 A1 * | 11/2006 | Aldrich ................ | G06Q 10/107 709/206 |

(Continued)

OTHER PUBLICATIONS

Wikipedia, "Conversation threading", http://en.wikipedia.org/wiki/Conversation_threading, last updated Aug. 10, 2014.

(Continued)

*Primary Examiner* — John B Walsh
*Assistant Examiner* — Weiwei Y Stiltner
(74) *Attorney, Agent, or Firm* — Thomas Grzesik; Fleit Intellectual Property Law (57) ABSTRACT

The present disclosure provides for an end-user communication device of a messaging system configured to identify messages exchanged during a message conversation. Responsive to selection of one or more data files, the device retrieves the one or more selected data files from a local memory of the device or from a server of the messaging system. Optionally, the messages may be identified in response to a request to add one or more new recipients in a reply to a message of a message conversation and selected data files may be forwarded to the new recipients.

19 Claims, 7 Drawing Sheets

(56) References Cited

U.S. PATENT DOCUMENTS

| | | | | |
|---|---|---|---|---|
| 2009/0094335 A1* | 4/2009 | Edmonds | ............... | G06F 15/16 |
| | | | | 709/206 |
| 2009/0287777 A1* | 11/2009 | Bhogal | ............... | G06Q 10/107 |
| | | | | 709/206 |
| 2009/0313348 A1* | 12/2009 | Plestid | ................. | H04L 12/583 |
| | | | | 709/217 |
| 2009/0319618 A1 | 12/2009 | Affronti et al. | | |
| 2011/0066685 A1* | 3/2011 | Kitada | ................. | H04L 12/584 |
| | | | | 709/206 |
| 2011/0173437 A1* | 7/2011 | Basir | .................. | H04L 12/5855 |
| | | | | 713/150 |
| 2012/0079033 A1* | 3/2012 | Vuong | ................. | H04L 12/586 |
| | | | | 709/206 |
| 2012/0079041 A1* | 3/2012 | Vuong | ................. | G06Q 10/107 |
| | | | | 709/206 |
| 2014/0201291 A1* | 7/2014 | Russell | ................ | H04W 4/023 |
| | | | | 709/206 |
| 2015/0106877 A1* | 4/2015 | Meyers | ................... | H04L 51/34 |
| | | | | 726/3 |
| 2015/0120842 A1* | 4/2015 | Huggins | ................ | H04L 51/08 |
| | | | | 709/206 |
| 2015/0134751 A1* | 5/2015 | Meyers, Jr. | ............. | H04L 51/08 |
| | | | | 709/206 |
| 2015/0200885 A1* | 7/2015 | Sharp | ..................... | H04L 51/08 |
| | | | | 709/206 |

OTHER PUBLICATIONS

Examination Report issued for European Patent Application No. 15182825.8 pursuant to Article 94(3) dated Nov. 19, 2018.

* cited by examiner

AUTOMATIC IDENTIFICATION AND RETRIEVAL OF MESSAGE ATTACHMENTS IN A MESSAGE CONVERSATION

BACKGROUND

Electronic messaging, such as email, is widely used to enable communication between users via computer networks. Often, messages are generated as replies to previous messages and a chain of messages, or a message conversation, is established. A message typically contains a header, containing information such as the network address of the sender and intended recipients, a text-based message body and, optionally, a data file attachment. During the course of a message conversation, multiple data files may be exchanged between the participants in the message conversation.

It may be desired to identify and retrieve messages exchanged during a message conversation. For example, when one or more new participants are added to message conversation, it may be desirable to send some of the previously exchanged data files to the new participants to enable them to participate fully in the conversation. Currently, a user has to choose between forwarding the entire conversation to a new participant or sorting through prior emails to find attachments and manually attaching them to a message. The first approach may be undesirable, since it may be undesirable to send some of the conversation or some of the data files to the new recipients. The second approach requires multiple user steps and is inefficient.

It would be useful to provide a method for efficiently identifying and retrieving messages previously exchanged during a message conversation, and for sending the messages, to new participants in the conversation.

BRIEF DESCRIPTION OF THE DRAWINGS

Exemplary embodiments of the present disclosure will be described below with reference to the included drawings such that like reference numerals refer to like elements and in which.

DETAILED DESCRIPTION

For simplicity and clarity of illustration, reference numerals may be repeated among the figures to indicate corresponding or analogous elements. Numerous details are set forth to provide an understanding of the illustrative embodiments described herein. The embodiments may be practiced without these details. In other instances, well-known methods, procedures, and components have not been described in detail to avoid obscuring the disclosed embodiments. The description is not to be considered as limited to the scope of the embodiments shown and described herein.

An aspect of the present disclosure relates to an end-user communication device of a massaging system. The messaging device may be a desktop, portable, laptop or tablet computer, for example, or a smartphone, or any electronic device have a messaging capability.

Figure 1:
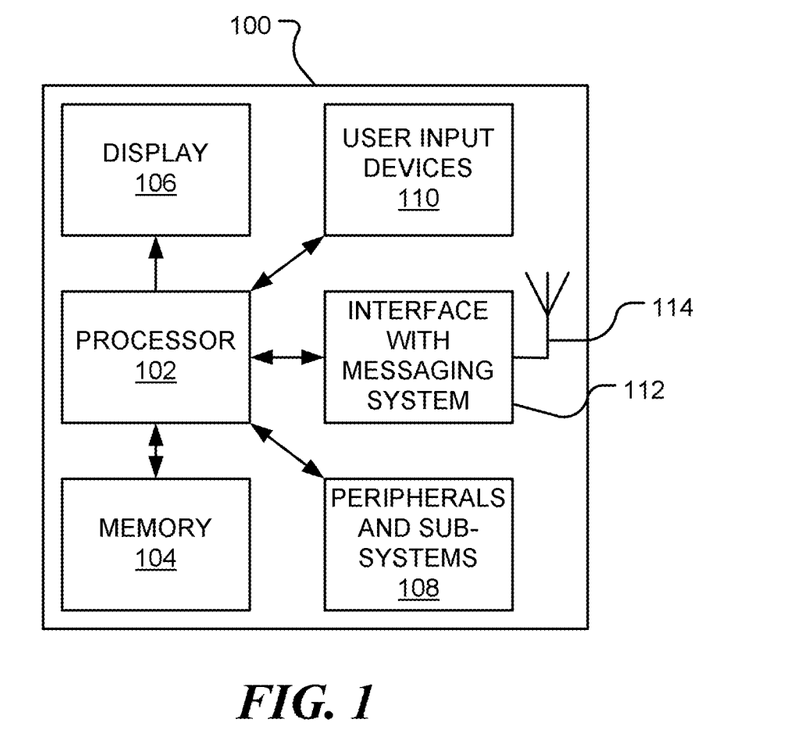
FIG. 1 is a block diagram of an end-user communication device, in accordance with exemplary embodiments of the present disclosure.

An end-user communication device, in accordance with exemplary embodiments of the disclosure, is shown in FIG. 1. The end-user communication device 100 includes a processor 102, operatively coupled to a memory 104 and a graphical display 106. The device 100 may also include various other peripheral devices and subsystems 108, together with user input devices 110. The user input devices 110 may include, for example, a keyboard, a voice input, a touch pad, and/or a pointing stick. In addition, the display 106 may be a touch sensitive display to enable user input. The device 100 also includes an interface 112 with a messaging system. The interface 112 may be a wireless interface, having antenna 114. The interface 112 may be a wired interface.

The end-user communication device 100 is operable to send and receive messages over a messaging system. In some embodiments the messages are electronic mail (email) messages. The messages may be sent over the Internet using an SMTP/MIME (Simple Mail Transfer Protocol/Multipurpose Internet Mail Extension) for example. SMTP specifies the transfer of simple text messages, while MIME enables data files of any type to be inserted into the message. In particular, one or more data files may be attached to an email in the form of one or more attachments.

In one embodiment, the device is configured to execute a messaging application, such as an email client application, for receiving and sending messages. For example, a local email client may be used using POP or IMAP, or a network-based system may be used using HTTP or HTTPS, for example. Messages may be exchanged between the device and one or more message recipients.

Often, a chain of messages, referred to as a message conversation, may be formed where, following an initial message, each message is a reply to a preceding message. The chain may be recognized by a variety of methods. For example, a common 'subject' line may be present in a message header, or the message may be generated by requesting a 'reply' to a received message (rather than being created as a new message).

Some messages in the collection of messages forming the message conversation may contain data file attachments. For example, a document may be circulated for discussion or editing. Updated versions of the document or additional documents may be added. Various techniques for recognizing messages in a conversation will be apparent to those of ordinary skill in the art.

In accordance with an embodiment of the disclosure, a method is provided for an end-user communication device of a messaging system, to identify a chain of sent and received messages of a message conversation, identify one or more data files attached to at least one message of the chain of messages of the message conversation; and display identifiers of the one or more data files on a display of the end-user communication device. In this way, multiple exchanged attachments may be identified without a user having to manually search through a list of previously exchanged messages.

The identifiers of the discovered messages may be displayed to the user to enable selection of one or more data files. Responsive to selection of one or more identified data files, the one or more selected data files may be automatically retrieved. The data files may be retrieved from a memory of the devices, or when a data is not found on the device, the data files may be retrieved from a server of the messaging system.

In one embodiment, the exchanged messages may be identified in response to a direct user request.

In a further embodiment, the exchanged messages are identified when new message recipients in a message conversation.

The message conversation originates as a conversation between two or more participants. However, at any point in an ongoing message conversation it may be desirable to add additional participants. Further, when replying to a message in a message conversation, it may be desirable that the new participants receive copies of the attachments previously exchanged during the conversation.

In accordance with exemplary embodiments of the present disclosure, an end-user communication device responds to a request to add one or more new recipients in a reply to a message of a chain of messages of a message conversation by displaying, on the graphical display, an option to forward one or more data files to the one or more new recipients, the one or more data files comprising data files attached to at least one message of the chain of messages of the message conversation. A list of previously exchanged attachments is displayed and the user may select or deselect attachments to be sent to the new recipients. Responsive to selection of one or more data files, the device automatically retrieves the data files and attaches them to the message to be sent to the one or more new recipients via the interface to the messaging system. In this manner, the previously exchanged attachments are made available to new recipients so that they can participate in the ongoing message conversation.

If a first data file to be attached is stored in the local memory 104 of the device 100, the data file can be read from the memory and inserted into the message.

If the first data file is not stored in the local memory, or cannot be found in the local memory (because a filename change for example), the first data file may be retrieved by downloading from a server of the messaging system using the interface 112 with the messaging system and incorporated into the message.

In a further embodiment, the message to be sent to the new recipients may be generated on a remote computer in response to instructions from the end-user communication device. The remote computer may be, for example, a messaging system server or a computer that has access to the messaging system server. In this embodiment, the end-user communication device makes a request to the remote computer and sends it the network addresses of the new participants. The end-user communication device may interact with the remote computer to select which data files are to be sent to the new participants.

In this way, attachments are efficiently and quickly provided to the new participants in the conversation with minimal user input.

Figure 2:
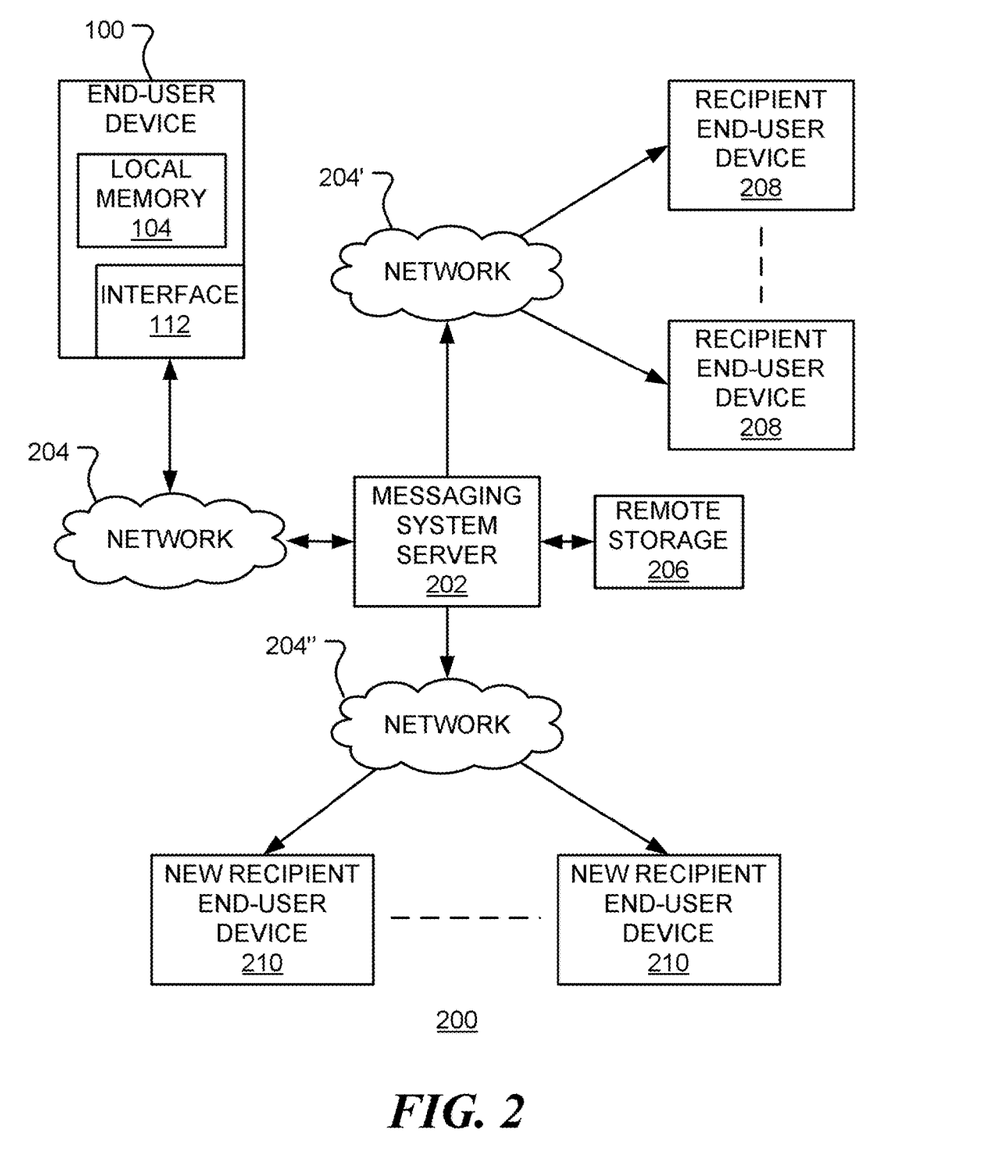
FIG. 2 is a block diagram of a messaging system, in accordance with exemplary embodiments of the disclosure.

Previously, a user wishing to add new participants to an ongoing message conversation would have to search through all messages in the conversation, find messages with attachments and then manually generate messages to send the attachments to the new participants. This is inefficient, particularly if the conversation is lengthy. FIG. 2 is a block diagram of a messaging system 200 in accordance with exemplary embodiments of the disclosure. The messaging system 200 includes an end-user communication device 100 that is operable to communicate with one or more messaging system servers 202 via a network 204. The network 204 may include one or more network components such as a cellular telephone network, the Internet, a local area network, etc. The messaging system server 202 has a storage element 206 that may be used to store messages passed to or sent from the end-user device 100. A variety of messaging protocols are known to those of ordinary skill in the art. A messaging conversation takes place between the end-user communication device 100 and one or more recipient end-user devices 208 using the network 204', which may be a branch of the network 204, or a different network. One or more end-user communication devices 210 of new participants receive messages from the messaging system server 202 via network 204", which again may be a branch of the network 204, or a different network.

It should be noted that an end-user device is any device used by any end-user to access messages at a particular message address. A single user may use different physical devices, such as a smartphone and a computer, to send and receive their messages. Further, a particular message address may be shared by multiple users and accessed using different devices.

Figure 3:
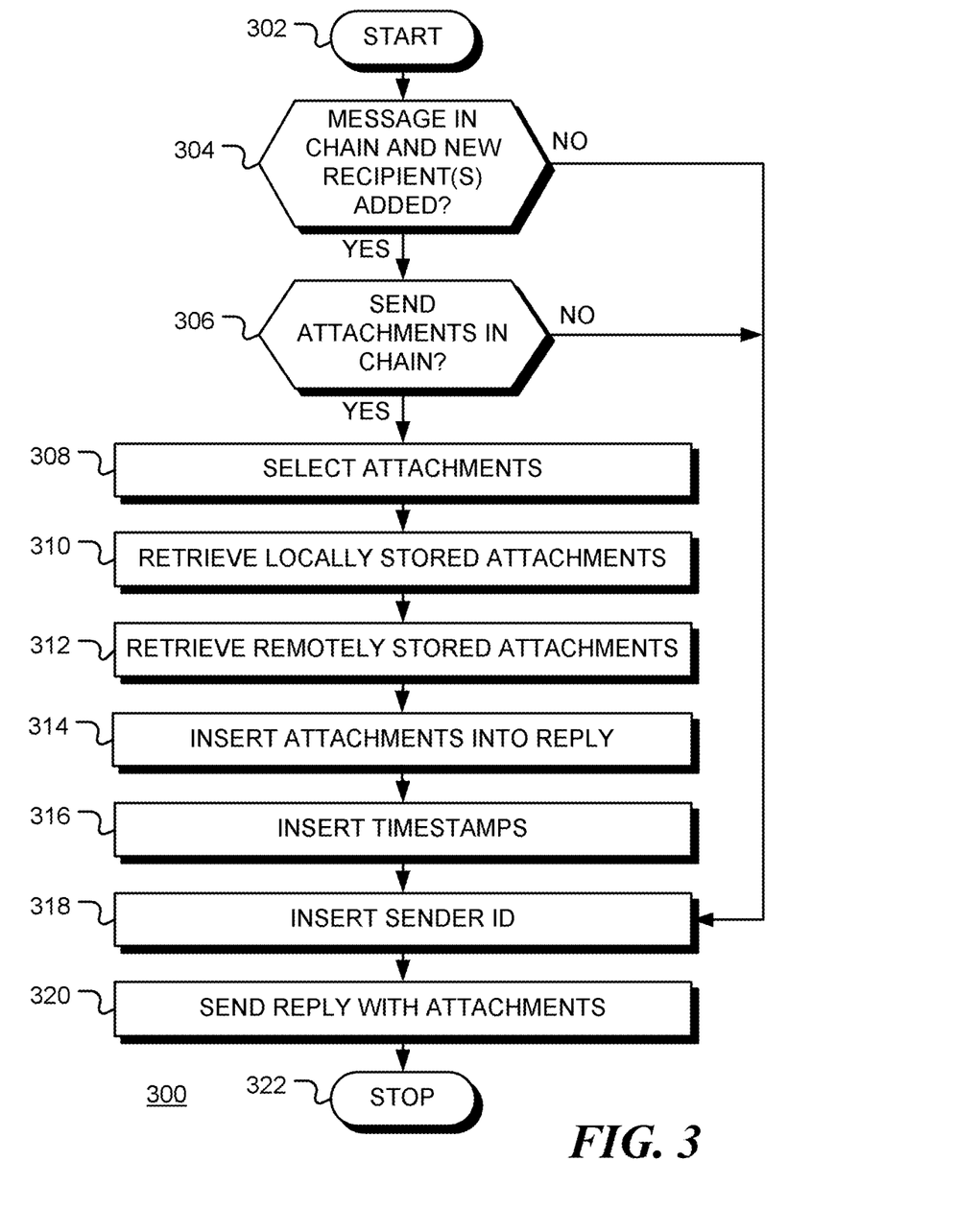
FIG. 3 is a flow chart of a method for automatic forwarding of message attachments, in accordance with exemplary embodiments of the disclosure.

FIG. 3 is a flow chart 300 of a method for automatic provision of message attachments in accordance with exemplary embodiments of the disclosure. Following start block 302, a messaging application is executed on an end-user communication device. The application may be a local application or a network-based application, such as a Web application accessed through a browser. At decision block 304, the application determines if a message reply being generated is part of a chain of messages and if new recipients have been added to the list of recipients. If the message is not part of a chain, or no new recipients have been added, the reply is sent at block 320 and the method ends at block 322. Conversely, if the message is part of a chain and new recipients have been added, as depicted by the positive branch from decision block 304, the application determines, at decision block 306, if attachments are to be sent to the new recipients. For example, a user prompt, such as a checkbox, button, banner or the like, may be displayed to enable the user to select if previously exchanged attachments are to be sent to the new recipients. If attachments are to be sent, as depicted by the positive branch from decision block 306, the application prompts the user to select which of the previously exchanged attachments are to be sent at block 308. At block 310, any locally stored attachments are retrieved and at block 312 any remotely stored attachments are retrieved. At block 314 the attachments are inserted into the message. Optionally, at block 316, timestamps is inserted into the message to indicate when each attachment was originally sent. Optionally, at block 318, an identifier (ID) of the original sender of each attachment is also inserted. At block 320 the reply message is sent, together with any selected attachments. Thus, when new recipients are added to a message conversation, attachments previously exchanged during the conversion are conveniently added to the message. In this manner, the selected attachments are sent to the new participants. The method terminates at block 322.

In accordance with one embodiment, the selected attachments are sent only to the new recipients. For example, two versions of the reply message may be generated automatically, one for previous recipients without the selected attachments and one for the new recipients, with the selected attachments. Alternatively, the reply message may include instructions for the messaging system, specifying which recipients should receive the selected attachments.

In a further embodiment, the selected attachments are sent to all recipients to ensure, for example, that a common set of data files is available to all recipients.

FIGS. 4-7 are diagrammatic views of an exemplary display 106, in accordance with embodiments of the disclosure. The display may be, for example, the display of a smartphone or other end-user communication device. The views depict a graphical user interface displayed at certain times during creation of a reply message in a chain of messages.

Figure 4:
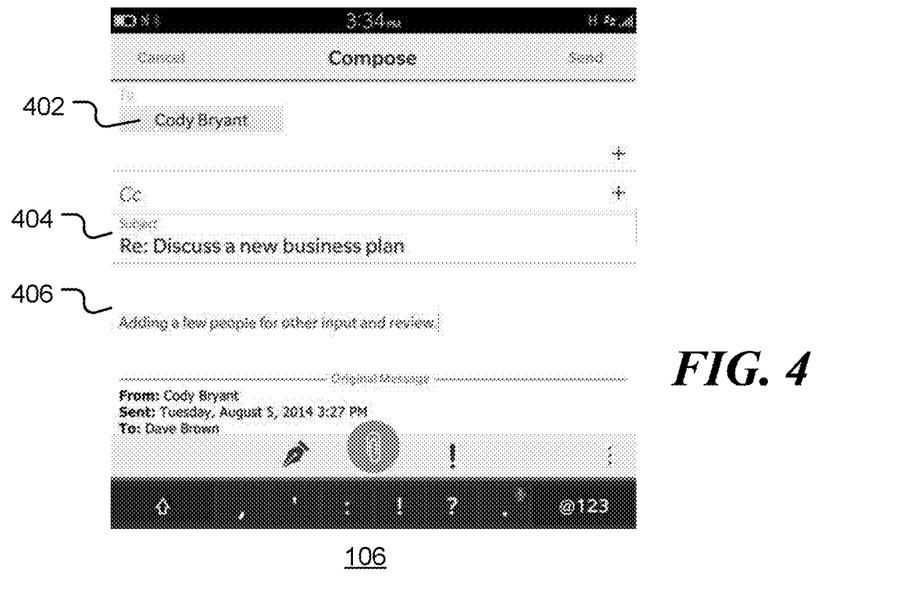
FIGS. 4-7 are diagrammatic views of an exemplary display of an end-user communication device, in accordance with embodiments of the disclosure.

Referring to FIG. 4, the graphical user interface shown on display 106 depicts a message containing a message header, which indicates the addressee 402, to whom the reply is being made, and the subject 404 of the message, in addition to a message body 406.

Figure 5:
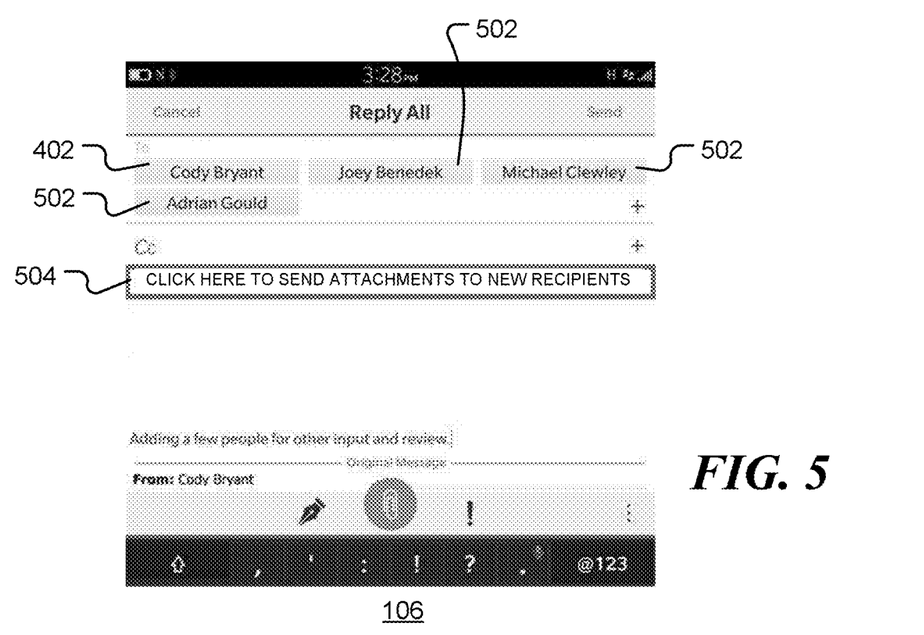

Referring to FIG. 5, the graphical user interface shown on display 106 indicates that a user has added new recipients 502 for the reply message. The new recipients are shown in the header region of the display 106. The device, which has access to a record of the preceding message conversation, determines that new recipients have been added and also determines if one or more attachments have been exchanged in prior messages. If attachments have been exchanged, an interface control element 504 is displayed to provide the user an option to attach the previously exchanged attachments to the reply message. The interface control element 504 may be a banner, as shown, a checkbox, a button, or other control element.

Figure 6:
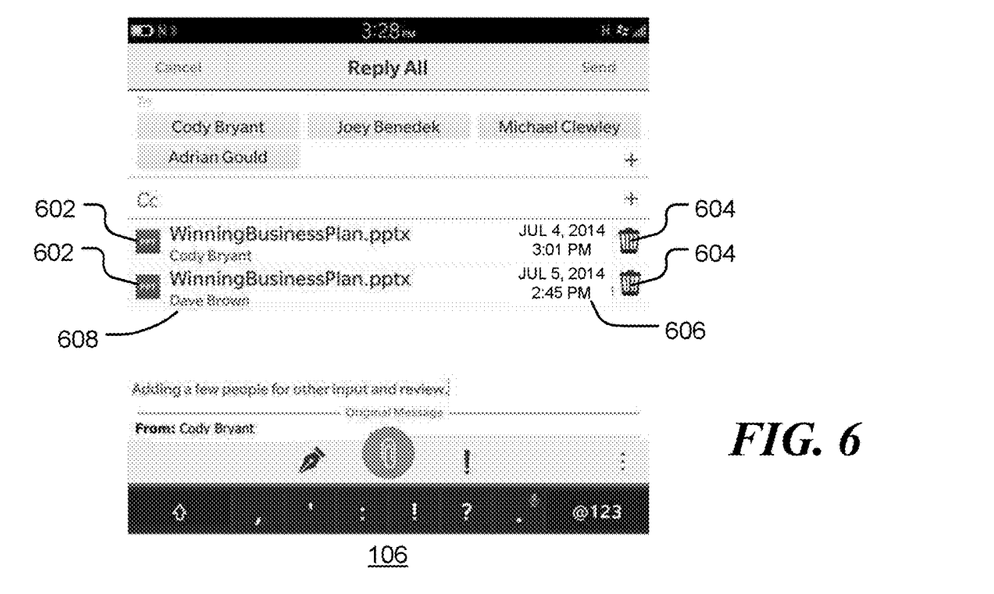

If an indication is received that the user wishes to add the attachments, for example responsive to the user clicking or touching interface control element 504, the previously exchanged attachments may be displayed as depicted in FIG. 6. Referring to FIG. 6, the graphical user interface indicates, in this example, that two attachments 602 have been exchanged. The graphical user interface also displays controls 604 to enable the user to deselect either attachment. Alternatively, a checkbox may be provided to enable the user to select or deselect attachments. In addition to the data file attachments 602, timestamps 606 may be inserted into the message to indicate when the attachment was sent, and sender ID's 608 may be inserted to indicate who originally sent the attachment.

Figure 7:
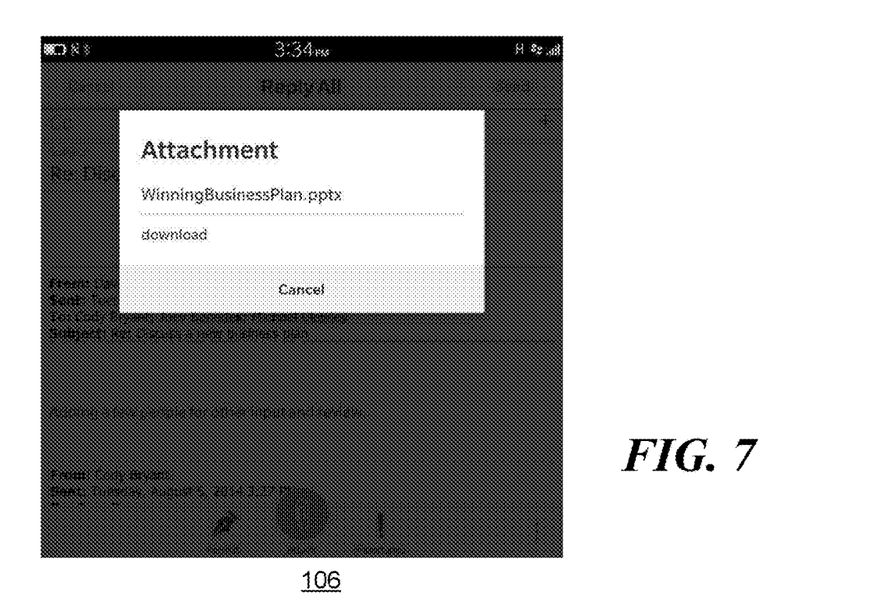

If an attachment is stored in a local memory of the device, the attachment may be retrieved before the message is sent. If an attachment is not stored locally, it may be downloaded from a remote source, such a message server of the messaging system. This is illustrated in FIG. 7, which depicts an exemplary display 106 while a data file (named "WinningBusinessPlan.pptx" in this example) is downloaded from the remote source. An option to cancel the download may also be presented.

Figure 8:
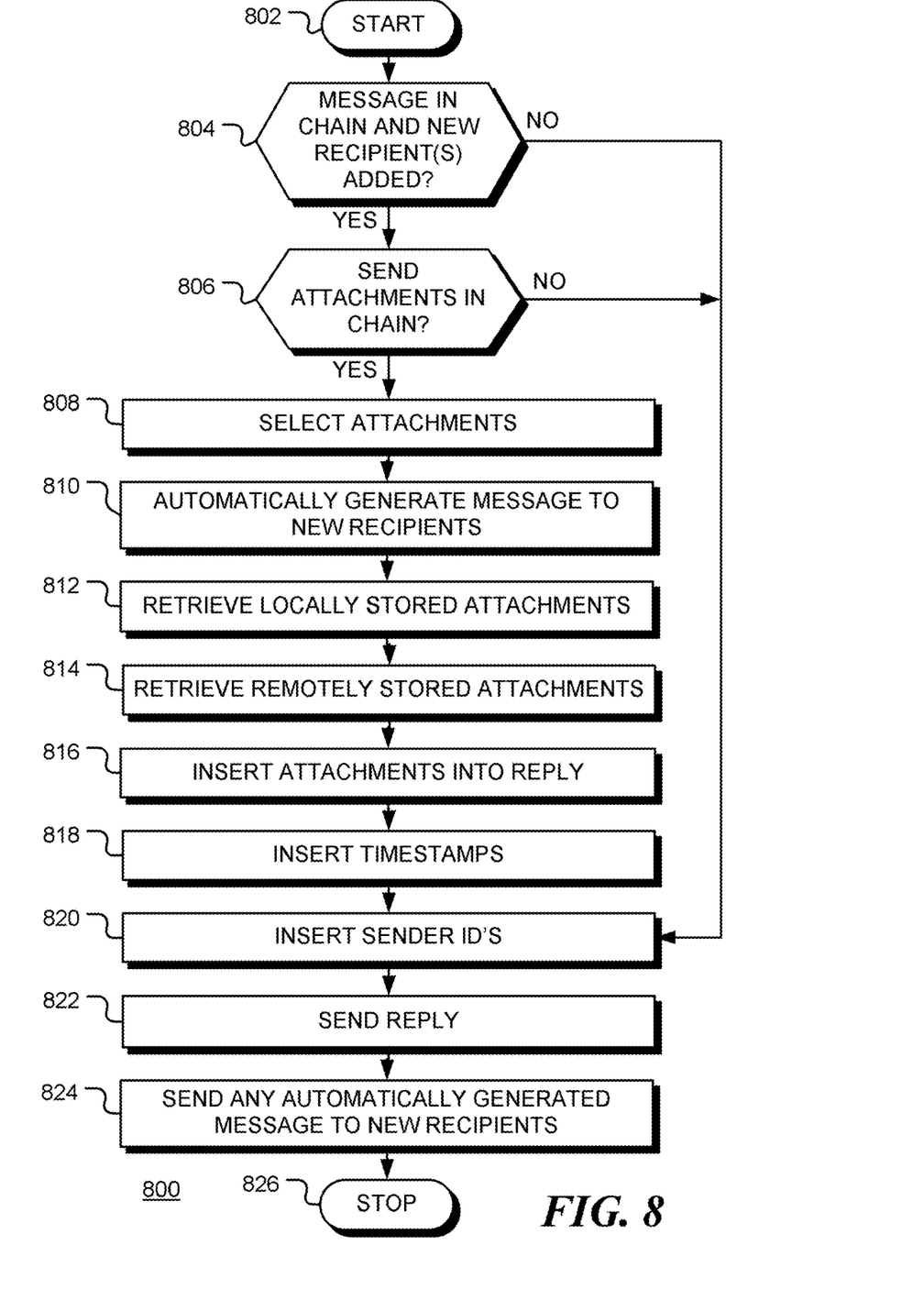
FIG. 8 is a flow chart of a further method for automatic forwarding of message attachments, in accordance with exemplary embodiments of the disclosure.

FIG. 8 is a flow chart 800 of a further method for automatic provision of message attachments in accordance with exemplary embodiments of the disclosure. Following start block 802, a messaging application is executed on an end-user communication device. The application may be a local application or a network-based application, such as a Web application accessed through a browser. At decision block 804, the application determines if a message reply being generated is part of a chain of messages and if new recipients have been added to the list of recipients. If the message is not part of a chain, or no new recipients have been added, the reply is sent at block 822 and, since no message has been automatically generated, the method ends at block 826. Conversely, if the message is part of a chain and new recipients have been added, as depicted by the positive branch from decision block 804, the application determines, at decision block 806, if attachments are to be sent to the new recipients. For example, user prompt, such as a checkbox, button, banner or the like, is displayed to enable the user to select if previously exchanged attachments are to be sent to the new recipients. If attachments are to be sent, as depicted by the positive branch from decision block 806 the application prompts the user to select which of the previously exchanged attachments are to be sent at block 808. A new message addressed to the new participants is generated automatically at block 810. At block 812 any locally stored attachments are retrieved and at block 814 any remotely stored attachments are retrieved. At block 816 the attachments are inserted into the automatically generated message. Optionally, at block 818, timestamps is inserted into the message to indicate when each attachment was originally sent. Optionally, at block 820, an identifier (ID) of the original sender of the attachment is also inserted. At block 822 the reply message is sent, and at block 824 the automatically generated message, together with the selected attachments, is sent. Thus, when new recipients are added to a message conversation, attachments previously exchanged during the conversion are conveniently added to an automatically generated message that is sent to the new recipients. In this manner, the selected attachments are sent to the new participants. The method terminates at block 826.

Figure 9:
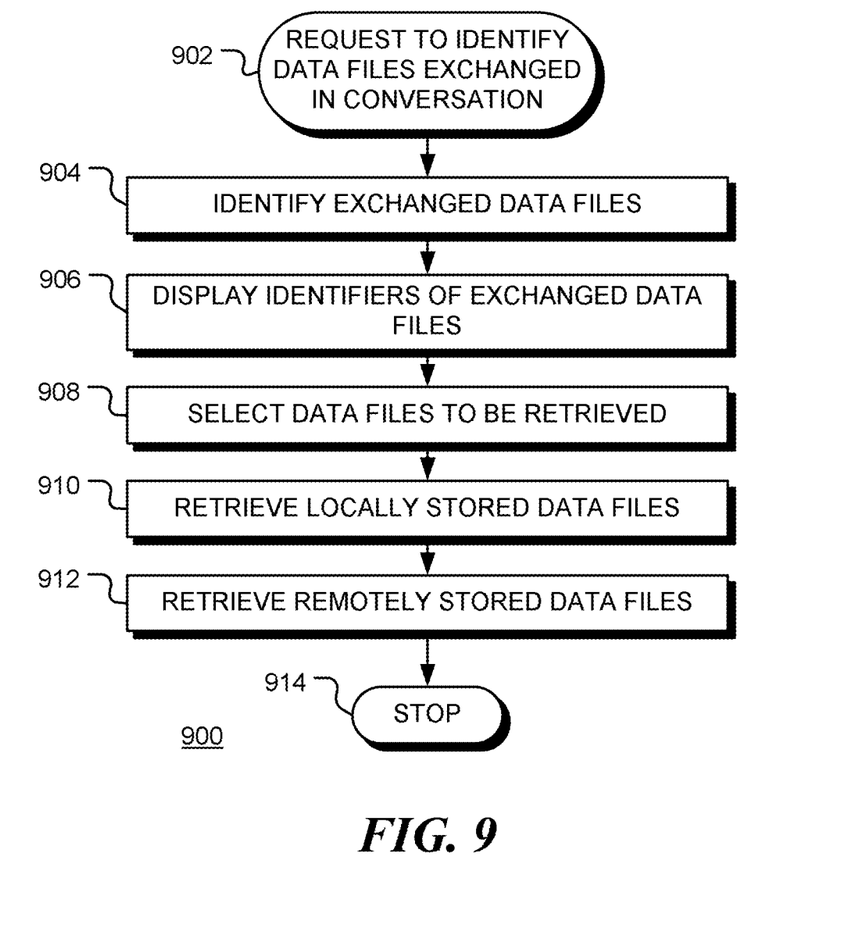
FIG. 9 is a flow chart of a further method for retrieving message attachments exchanged in a message conversation, in accordance with exemplary embodiments of the disclosure.

FIG. 9 is a flow chart 900 of a further method for retrieving message attachments exchanged in a message conversation, in accordance with exemplary embodiments of the disclosure. The process begins at block 902 when a request is received to identify messages exchanged during a message conversation. For example, the user may be prompted to make the request when new recipients are added to a reply in the message conversation, or the request may be initiated directly by the user, or the request may be issued by another application executing on the device. The device examines the messages in the conversation and identifies any exchanged data files at block 904. Identifiers or the data files, such as file names or icons for example, are displayed to the user at block 906 to enable the user to select data files to be retrieved. The data files to be retrieved are selected at block 908. At block 910, any selected data files stored in the local memory of the communication device are retrieved and, at block 912, any selected data files that cannot be found in the local memory are retrieved from a remote storage device, such as server of the messaging system. The retrieved files may be stored to a new location, sent as message attachments, or used by other applications, for example. The method terminates at block 914.

It will be appreciated that any module or component disclosed herein that executes instructions may include or otherwise have access to non-transient and tangible computer readable media such as storage media, computer storage media, or data storage devices (removable or non-removable) such as, for example, magnetic disks, optical disks, or tape data storage. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the server, any component of or related to the network, backend, etc., or accessible or connectable thereto. Any application or module herein described may be implemented using computer readable/executable instructions that may be stored or otherwise held by such computer readable media.

The implementations of the present disclosure described above are intended to be merely exemplary. It will be appreciated by those of skill in the art that alterations, modifications and variations to the illustrative embodiments disclosed herein may be made without departing from the scope of the present disclosure. Moreover, selected features from one or more of the above-described embodiments may be combined to create alternative embodiments not explicitly shown and described herein.

The present disclosure may be embodied in other specific forms without departing from its spirit or essential characteristics. The described exemplary embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method, implemented in an end-user communication device of a messaging system, comprising:
    determining that one or more new recipients have been added to a header region of a reply message of a message in a chain of messages of a message conversation, wherein the one or more new recipients were not previously associated with the chain of messages;
    responsive to determining that one or more new recipients have been added the header region of the reply message:
        determining, without further user interaction, that one or more data files have been previously received as attachments to one or more messages of the chain of messages;
        displaying a selectable prompt enabling an end-user to send the one or more data files to the one or more new recipients in response to determining that the one or more data files have been previously received as attachments;
        displaying, on the graphical display, an option to individually select each of the one or more data files in response to the end-user selecting the selectable prompt;
    responsive to selection of at least one of the one or more data files via the displayed option:
        retrieving the at least one of the one or more selected data files;
        automatically generating a new message addressed to the one or more new recipients;
        inserting the at least one of the one or more selected data files into the new message, wherein the new message is separate and distinct from the reply message, and wherein the reply message is addressed to one or more users previously associated with the message; and
        after the one or more selected data files has been inserted, sending the reply message to the one or more users and the new message to the one or more new recipients via the remote computer of the messaging system.

2. The method of claim 1, wherein the message addressed to the one or more new recipients comprises the reply to the message of the chain of messages.

3. The method of claim 1, wherein the one or more selected data files are inserted into to the new message as attachments.

4. The method of claim 1, wherein displaying the selectable prompt comprises:
    displaying a graphical control on a graphical display of the end-user communication device.

5. The method of claim 1, wherein displaying the selectable prompt comprises:
    displaying a list of the data files attached to at least one message of the chain of messages of the message conversation on a graphical display of the end-user communication device.

6. The method of claim 1, wherein inserting a first data file of the selected data files into the new message comprises:
    incorporating a link to the first data file in the new message if the first data file is stored on a server of the messaging system.

7. The method of claim 1, further comprising, for each inserted data file, adding a timestamp to the new message corresponding to a time the data file was originally exchanged.

8. The method of claim 1, wherein retrieving a first data files of the one or more selected data files comprises retrieving the first data file from a memory of the end-user communication device.

9. The method of claim 1, wherein generating the new message addressed to the one or more new recipients comprises:
    requesting a remote computer of the messaging system to generate the new message, insert the attachments, and send the new message to the one or more new recipients.

10. The method of claim 1, wherein the messaging system comprises an electronic mail (email) system.

11. The method of claim 1, wherein the end-user communication device comprises a mobile telephone and the messaging system comprising a wireless telephone system.

12. The method of claim 1, wherein the messaging system comprises the Internet.

13. The method of claim 1, further comprising:
    responsive to selection of one or more identified data files:
        retrieving the one or more selected data files;
    wherein retrieving a first data file of the one or more selected data files comprises retrieving the first data file from a server of the messaging system when the first data file is not found in a memory of the end-user communication device.

14. A non-transitory computer-readable medium having computer-executable instructions that, when executed by a processor of an end-user communication device, cause the processor to perform the method of claim 1.

15. An end-user communication device comprising:
    a graphical display;
    an interface with a messaging system; and
    a processor, operatively coupled to the graphical display and the interface with the messaging system and configured to perform a method comprising:
        determining that one or more new recipients have been added to a header region of a reply message of a message in a chain of messages of a message conversation, wherein the one or more new recipients were not previously associated with the chain of messages;

responsive to determining that one or more new recipients have been added to the header region of the reply message:
- determining, without further user interaction, that one or more data files have been previously received as attachments to one or more messages of the chain of messages;
- displaying a selectable prompt enabling an end-user to send the one or more data files to the one or more new recipients in response to determining that the one or more data files have been previously received as attachments;
- displaying, on the graphical display, an option to individually select each of the one or more data files in response to the end-user selecting the selectable prompt;
- responsive to selection of at least one of the one or more data files via the displayed option:
  - retrieving the at least one of the one or more selected data files;
  - automatically generating a new message addressed to the one or more new recipients;
  - inserting the at least one of the one or more selected data files into the new message, wherein the new message is separate and distinct from the reply message, and wherein the reply message is addressed to one or more users previously associated with the message; and
  - after the one or more selected data files has been inserted, sending the reply message to the one or more users and the one or more new recipients via the remote computer of the messaging system.

16. The end-user communication device of claim 15, further comprising:
a memory operatively coupled to the processor,
wherein retrieving a first data file of the one or more selected data files comprises:
retrieving the first data file from the memory of the end-user communication device.

17. The end-user communication device of claim 15, wherein retrieving a first data file of the one or more selected data files comprises:
retrieving the first data file from a server of the messaging system using the interface with the messaging system.

18. The end-user communication device of claim 15, wherein the end-user communication device comprises a smartphone.

19. The end-user communication device of claim 15, wherein messaging system comprises an electronic mail (email) system.

* * * * *